(12) United States Patent
Matsumoto et al.

(10) Patent No.: US 11,911,846 B2
(45) Date of Patent: Feb. 27, 2024

(54) WORK PROCESSING APPARATUS

(71) Applicant: ENSHU Limited, Hamamatsu (JP)

(72) Inventors: Koutaro Matsumoto, Hamamatsu (JP);
Kenzo Tanaka, Hamamatsu (JP);
Takeshi Muraki, Hamamatsu (JP);
Kazushige Morozumi, Hamamatsu
(JP); Yoshimichi Uda, Hamamatsu (JP);
Daiki Ishizuka, Hamamatsu (JP)

(73) Assignee: ENSHU LIMITED, Shizuoka (JP)

( * ) Notice: Subject to any disclaimer, the term of this patent is extended or adjusted under 35 U.S.C. 154(b) by 0 days.

(21) Appl. No.: 16/651,002

(22) PCT Filed: Sep. 27, 2019

(86) PCT No.: PCT/JP2019/038120
§ 371 (c)(1),
(2) Date: Mar. 26, 2020

(87) PCT Pub. No.: WO2020/075528
PCT Pub. Date: Apr. 16, 2020

(65) Prior Publication Data
US 2021/0220946 A1    Jul. 22, 2021

(30) Foreign Application Priority Data

Oct. 10, 2018   (JP) ................. 2018-191559

(51) Int. Cl.
*B23K 26/10* (2006.01)
*B23K 26/342* (2014.01)
(Continued)

(52) U.S. Cl.
CPC ............ *B23K 26/10* (2013.01); *B23K 26/083* (2013.01); *B23K 26/0823* (2013.01); *B23K 26/342* (2015.10); *C23C 4/12* (2013.01)

(58) Field of Classification Search
None
See application file for complete search history.

(56) References Cited

U.S. PATENT DOCUMENTS

| 7,213,316 B2 * | 5/2007 | Kato | ................. B23Q 41/02 |
| | | | 29/33 |
| 2005/0254914 A1 | 11/2005 | Kato | |

(Continued)

FOREIGN PATENT DOCUMENTS

| CN | 101020292 A |   | 8/2007 |   |
| CN | 105397239 A | * | 3/2016 | .............. Y02P 70/10 |

(Continued)

OTHER PUBLICATIONS

Machine translation of KR 20110018835 A performed on May 16, 2022, Shikayama et al. (Year: 2011).*

(Continued)

*Primary Examiner* — Dana Ross
*Assistant Examiner* — Kevin Guanhua Wen
(74) *Attorney, Agent, or Firm* — Pearne & Gordon LLP

(57) ABSTRACT

Provided is a work processing apparatus configured so that limitations on the contents of processing for a work piece or the type of work piece can be reduced and processing for a wider range of processing contents and work piece can be performed. In a work processing apparatus 100, a work table 101 is, through a table displacement mechanism 103, supported on a rotation base 120 to be rotatably driven by a table rotary drive motor 125, and a weight holding tool 110 is supported on the rotation base 120 through a weight displacement mechanism 114. The table displacement mechanism 103 includes a rack-and-pinion mechanism configured to displace the work table 101 in an X-axis direction as viewed in the figure. At the table displacement mechanism 103, a power inputter 108 configured to input drive force from a table displacement mechanism drive apparatus 130 is (Continued)

provided. The table displacement mechanism drive apparatus 130 is, by a drive source displacement apparatus 132, connected to or disconnected from the power inputter 108.

14 Claims, 4 Drawing Sheets

(51) Int. Cl.
*C23C 4/12* (2016.01)
*B23K 26/08* (2014.01)

(56) References Cited

U.S. PATENT DOCUMENTS

2007/0187367 A1 8/2007 Kita et al.
2016/0354884 A1* 12/2016 Grob .................. B23Q 1/52

FOREIGN PATENT DOCUMENTS

| CN | 107755880 A | * | 3/2018 | ......... B23K 37/0426 |
|---|---|---|---|---|
| JP | H10-286687 A | | 10/1998 | |
| JP | H10286687 A | * | 10/1998 | ............ B23K 26/34 |
| JP | 2003-025170 A | | 1/2003 | |
| JP | 2005-313269 A | | 11/2005 | |
| JP | 2008-149326 A | | 7/2008 | |
| JP | 2009-113048 A | | 5/2009 | |
| JP | 2018-089771 A | | 6/2018 | |
| KR | 20110018835 A | * | 2/2011 | ........... H02K 11/215 |

OTHER PUBLICATIONS

Machine translation of CN 105397239 A performed on May 16, 2022, Wang (Year: 2016).*
Machine translation of JP H10286687 A performed on May 16, 2022, Kinoshita et al. (Year: 1998).*
Machine translation of CN 107755880 A performed on Jan. 9, 2023, Lin (Year: 2018).*
Office Action dated May 7, 2021 for the corresponding Chinese Patent Application No. 201980004616.7.
International Search Report dated Nov. 19, 2019 filed in PCT/JP2019/038120 (No translation available yet).

* cited by examiner

WORK PROCESSING APPARATUS

TECHNICAL FIELD

The present invention mainly relates to a work processing apparatus configured to perform thermal spray processing or clad processing for a work piece.

BACKGROUND ART

Typically, there has been a work processing apparatus configured to perform thermal spray processing or clad processing (also called "cladding") for a work piece made of a metal material. For example, a laser processing apparatus disclosed in Patent Literature 1 below performs, for an engine cylinder head as a work piece, the clad processing of a valve seat portion. In this laser processing apparatus, a mount on which the work piece is placed is supported on a rotation base to be rotatably driven in a state in which the mount is displaceable in an X-axis direction and a Y-axis direction perpendicular to each other through an X-axis slider and a Y-axis slider.

CITATION LIST

Patent Literature

PATENT LITERATURE 1: JP-A-10-286687

However, in the laser processing apparatus described in Patent Literature 1 above, the rotation base cannot continuously rotate in one direction for the purpose of avoiding entanglement of wiring of an X-axis motor and a Y-axis motor each included in the X-axis slider and the Y-axis slider supported on the rotation base. For this reason, there is a problem that limitations on the contents of processing for the work piece and the type of work piece are great.

The present invention has been made for coping with the above-described problem, and an object of the present invention is to provide a work processing apparatus configured so that limitations on the contents of processing for a work piece or the type of work piece can be reduced and processing for a wider range of processing contents and work piece can be performed.

SUMMARY OF THE INVENTION

In order to achieve the object, a feature of the present invention is a work processing apparatus which includes a work table arranged facing a processing head configured to perform processing for a work piece and configured to hold the work piece, a table displacement mechanism configured to displace the work table in a direction perpendicular to an arrangement direction of the processing head, a table displacement mechanism drive apparatus configured to generate drive force for driving the table displacement mechanism, a table rotary drive apparatus configured to support the work table and the table displacement mechanism such that the work table and the table displacement mechanism are integrally rotatably drivable, and a control apparatus configured to control actuation of each of the table displacement mechanism drive apparatus and the table rotary drive apparatus, the work processing apparatus including: a drive source displacement apparatus configured to cause the table displacement mechanism drive apparatus to approach or separate from the table displacement mechanism to connect the table displacement mechanism drive apparatus to the table displacement mechanism or disconnect the table displacement mechanism drive apparatus from the table displacement mechanism.

According to the feature of the present invention configured as described above, the work processing apparatus is configured to connect the table displacement mechanism drive apparatus configured to provide drive force to the table displacement mechanism to the table displacement mechanism supported on the table rotary drive apparatus or disconnect the table displacement mechanism drive apparatus from the table displacement mechanism by the drive source displacement apparatus. Thus, the work table can be rotated without the need for considering wiring of the table displacement mechanism drive apparatus. As a result, the work processing apparatus according to the present invention can perform forward or reverse rotation of the work table more than once, and can perform high-speed rotation of the work table. Thus, limitations on the contents of processing for the work piece or the type of work piece can be reduced, and processing for a wider range of processing contents and work piece can be performed.

Further, another feature of the present invention is the work processing apparatus in which the table rotary drive apparatus further supports a weight holding tool such that the weight holding tool is rotatably drivable, and the weight holding tool holds a counter weight on an opposite side of a rotation center axis of the table rotary drive apparatus from a position of the work table.

According to the other feature of the present invention configured as described above, the work processing apparatus holds the counter weight on the opposite side of the rotation center axis of the table rotary drive apparatus from the position of the work table. Thus, balance of the work table holding the work piece upon rotary drive can be ensured, and rotary drive of the work table can be stabilized.

Further, still another feature of the present invention is the work processing apparatus further including: a weight displacement mechanism configured to displace the weight holding tool in a radial direction with respect to the rotation center axis of the table rotary drive apparatus.

According to the other feature of the present invention configured as described above, the work processing apparatus includes the weight displacement mechanism configured to displace the weight holding tool configured to hold the counter weight in the radial direction with respect to the rotation center axis of the table rotary drive apparatus. Thus, according to the mass of the work piece or the number of rotations of the work table, centrifugal force generated by the counter weight can be set or changed as necessary.

Further, still another feature of the present invention is the work processing apparatus in which the weight displacement mechanism is driven by the table displacement mechanism drive apparatus.

According to the other feature of the present invention configured as described above, in the work processing apparatus, the weight displacement mechanism is driven by the table displacement mechanism drive apparatus. Thus, a drive source is shared so that complication and enlargement of an apparatus configuration can be prevented and simplification and downsizing can be realized. Moreover, in the work processing apparatus, the table displacement mechanism and the weight displacement mechanism share the drive source. Thus, the weight holding tool is easily displaced with an amount equal or equivalent to the amount of displacement of the work table. Thus, the centrifugal force generated by the counter weight can be accurately and easily set.

Further, still another feature of the present invention is the work processing apparatus in which the weight holding tool is arranged between the table rotary drive apparatus and the work table.

According to the other feature of the present invention configured as described above, in the work processing apparatus, the weight holding tool is arranged between the table rotary drive apparatus and the work table. Thus, a space on the work table is ensured, and therefore, the number of holdable work piece types can be increased and the process of attaching the work piece to the work table or detaching the work piece from the work table can be facilitated. Moreover, according to the work processing apparatus of the present invention, the work table and the weight holding tool are not arranged on the same plane. Thus, the stroke of displacement of each of these components can be set longer.

Further, still another feature of the present invention is the work processing apparatus further including: a table-side inputter/outputter provided at the table rotary drive apparatus to input/output at least one of a hydraulic pressure, a pneumatic pressure, power, or an electrical signal; a body-side inputter/outputter configured to input the at least one of the hydraulic pressure, the pneumatic pressure, the power, or the electrical signal to the table-side inputter/outputter or output the at least one of the hydraulic pressure, the pneumatic pressure, the power, or the electrical signal from the table-side inputter/outputter; and an inputter/outputter displacement apparatus configured to cause the body-side inputter/outputter to approach or separate from the table-side inputter/outputter to connect the body-side inputter/outputter to the table-side inputter/outputter or disconnect the body-side inputter/outputter from the table-side inputter/outputter.

According to still another feature of the present invention configured as described above, the work processing apparatus includes the inputter/outputter displacement apparatus. The inputter/outputter displacement apparatus connects the body-side inputter/outputter configured to input/output at least one of the hydraulic pressure, the pneumatic pressure, the power, or the electrical signal to the table-side inputter/outputter configured to input/output at least one of the hydraulic pressure, the pneumatic pressure, the power, or the electrical signal on a table rotary drive apparatus side or disconnect the body-side inputter/outputter from the table-side inputter/outputter. Thus, the work processing apparatus can be configured such that various functions are achieved on the table rotary drive apparatus. For example, the work processing apparatus can perform, using the hydraulic pressure or the pneumatic pressure, fixing of the position of the work table or the weight holding tool, clamping of the work piece on the work table, or clamping of the counter weight by the weight holding tool.

G Moreover, the work processing apparatus can perform, by power supply or electrical signal transmission/reception, various types of sensing such as detection of the position of the work table or the weight holding tool or detection of the mass of the work piece or the counter weight, for example.

Further, still another feature of the present invention is the work processing apparatus in which the control apparatus controls, when stopping rotary drive of the work table rotatably driven by the table rotary drive apparatus actuation of the table rotary drive apparatus such that a portion of the table displacement mechanism connected to the table displacement mechanism drive apparatus is stopped at a position facing a portion of the table displacement mechanism drive apparatus connected to the table displacement mechanism.

According to still another feature of the present invention configured as described above, in the work processing apparatus, the control apparatus controls, when stopping rotary drive of the work table rotatably driven by the table rotary drive apparatus, actuation of the table rotary drive apparatus such that the portion of the table displacement mechanism connected to the table displacement mechanism drive apparatus is stopped at the position facing the portion of the table displacement mechanism drive apparatus connected to the table displacement mechanism. With this configuration, in the work processing apparatus, when rotary drive of the work table is stopped, the table displacement mechanism drive apparatus can be quickly connected to the table displacement mechanism only by direct advance. Further, upon disconnection of the table displacement mechanism drive apparatus, quick disconnection can be implemented. Thus, the time of processing the work piece can be shortened.

DESCRIPTION OF THE EMBODIMENTS

Figure 1:
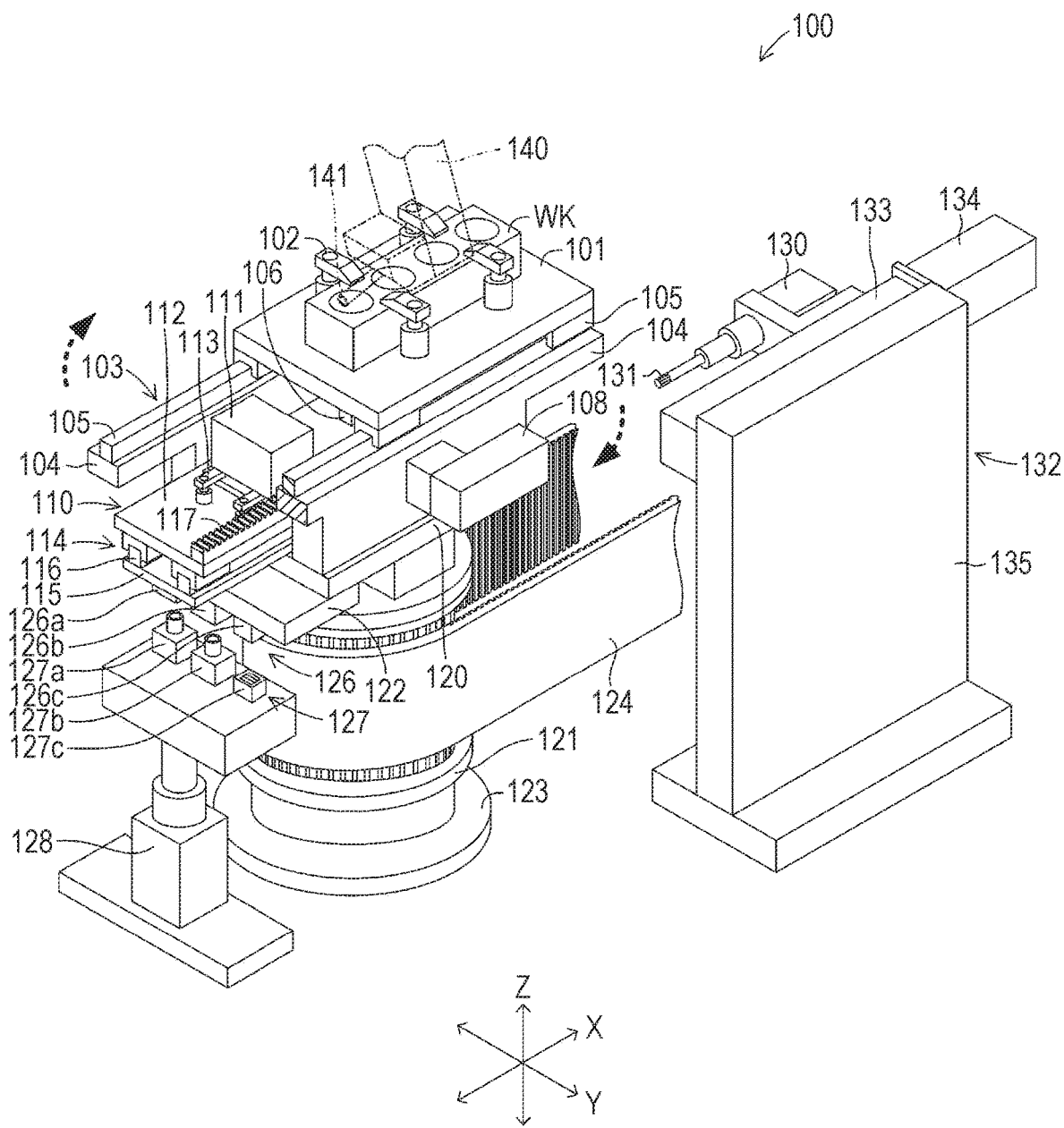
FIG. 1 is a partially-broken perspective view schematically illustrating the outline of an external configuration of a main portion of a work processing apparatus according to the present invention.
Figure 2:
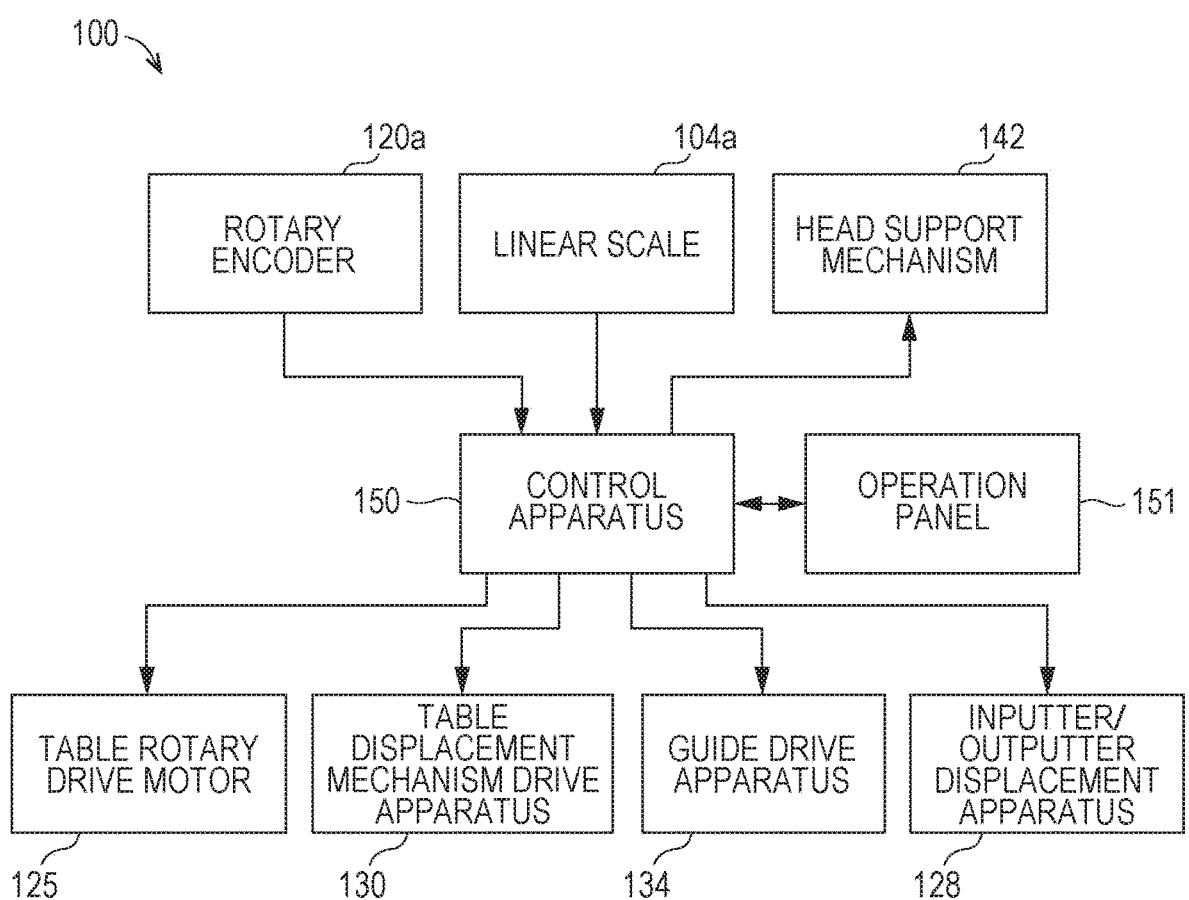
FIG. 2 is a block diagram of a control system for controlling actuation of the work processing apparatus illustrated in FIG. 1.

Hereinafter, one embodiment of a work processing apparatus according to the present invention will be described with reference to the drawings. FIG. 1 is a perspective view schematically illustrating the outline of an external configuration of a main portion of a work processing apparatus 100 according to the present invention. Moreover, FIG. 2 is a block diagram of a control system for controlling actuation of the work processing apparatus 100 illustrated in FIG. 1. Note that for the sake of easy understanding of the present invention, the figures used as a reference in the present specification are schematically illustrated, and some components are exaggeratingly illustrated, for example. For this reason, dimensions, ratios and the like among the components vary in some cases.

The work processing apparatus 100 is a machining apparatus configured to perform, by computer control, thermal spray processing for a work piece WK including a cylinder block in a reciprocating engine (not shown). The thermal spray processing described herein is surface treatment for supplying and stacking a molten or semi-molten material onto a surface of the work piece WK to form a coating film or a reinforcement layer.

(Configuration of Work Processing Apparatus 100)

The work processing apparatus 100 includes a work table 101. The work table 101 is a part configured to detachably hold, in cooperation with clamps 102, the work piece WK as a processing target of the work processing apparatus 100. The work processing apparatus 100 is formed in such a manner that a cast material is formed into a flat plate shape. In the present embodiment, the work table 101 is, as viewed in plane, formed in a rectangular shape extending in an X-axis direction as viewed in the figure. The work table 101 is supported on a table displacement mechanism 103 in a horizontal orientation at a position facing a later-described processing head 140.

The clamp 102 is a part for fixing, onto the work table 101, the work piece WK placed on the worktable 101. The clamp 102 includes a hydraulic clamp of which claw configured to hold part of the work piece WK is to be driven by a hydraulic pressure. In the present embodiment, four clamps 102 are provided on the work table 101.

The table displacement mechanism 103 is a mechanical apparatus for linearly reciprocatably displacing the worktable 101. The table displacement mechanism 103 mainly includes each of guide support side walls 104, a table-side rack 106, a pinion 107, and a power inputter 108. The guide support side wall 104 is a part configured to support the worktable 101 through a linear guide 105. The guide support side walls 104 include two plate-shaped bodies standing in the vertical direction. The guide support side walls 104 are fixed onto a later-described rotation base 120 in a state in which the guide support side walls 104 extend along two long sides of the work table 101 below these long sides. Moreover, a linear scale 104a is provided between one of two guide support side walls 104 and the work table 101.

The linear scale 104a is a detector configured to electrically detect the position of the work table 101 in the X-axis direction as viewed in the figure to output an electrical signal corresponding to such a position. The linear scale 104a is electrically connected to a control apparatus 150 through each of a later-described table-side inputter/outputter 126 and a later-described body-side inputter/outputter 127.

The linear guide 105 is a part configured to support the work table 101 such that the work table 101 is slidable in the X-axis direction as viewed in the figure. The linear guide 105 includes a rail provided on an upper surface of the guide support side wall 104, and a slider provided on a lower surface of the work table 101 to slide on the rail.

Figure 3:
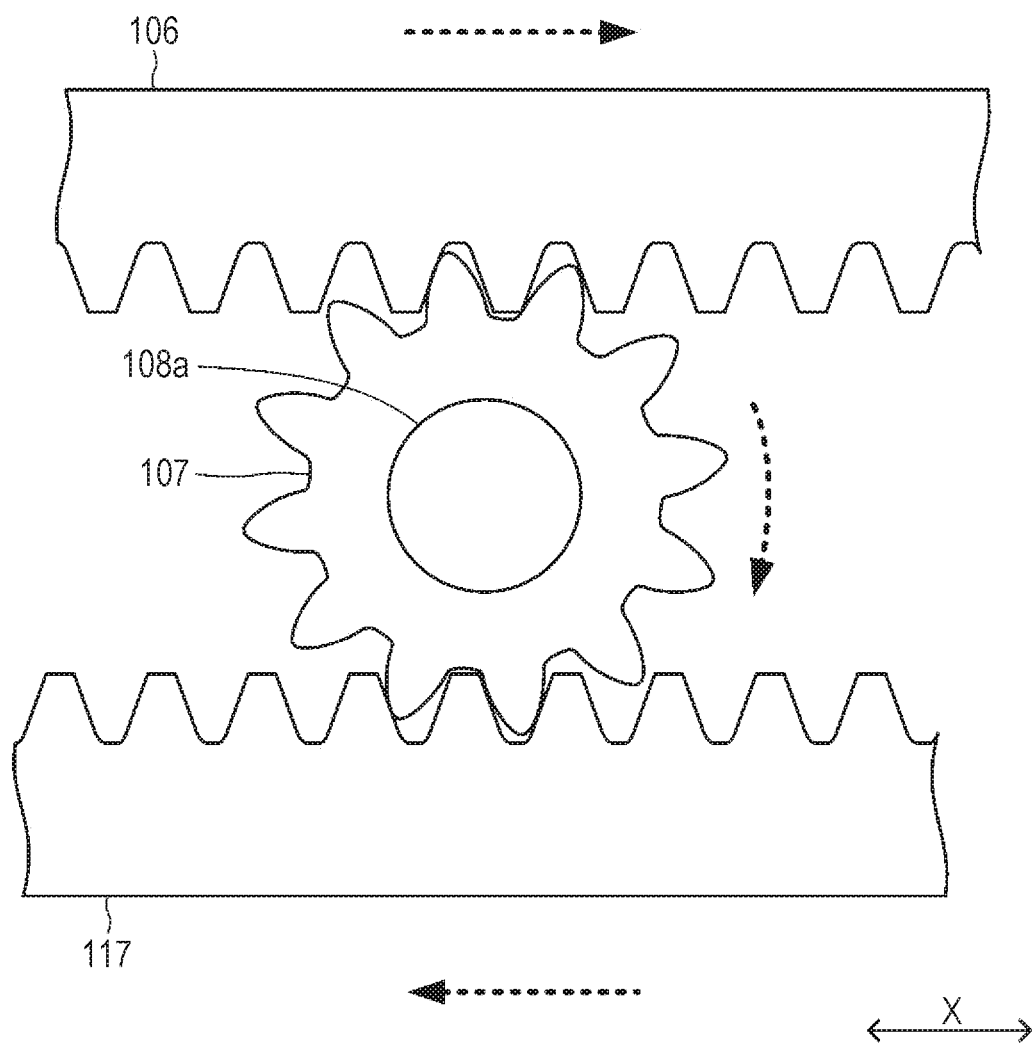
FIG. 3 is a schematic view for describing the outline of a configuration of a rack-and-pinion mechanism included in the work processing apparatus illustrated in FIG. 1.

As illustrated in FIG. 3, the table-side rack 106 and the pinion 107 are parts configured to reciprocatably displace the work table 101 in the X-axis direction as viewed in the figure. More specifically, the table-side rack 106 is configured such that teeth configured to engage with the pinion 107 are linearly formed on a plate-shaped body extending linearly. The table-side rack 106 is, on the lower surface of the work table 101, provided to extend in a longitudinal direction. On the other hand, the pinion 107 includes a gear configured such that teeth configured to engage with the table-side rack 106 and a later-described weight-side rack 117 are formed in a circular ring shape on an outer peripheral surface of a discoid body. The pinion 107 is provided at an output shaft 108a of the power inputter 108.

That is, the table-side rack 106 and the pinion 107 form a rack-and-pinion mechanism. Note that in FIG. 3, each of rotation directions of the table-side rack 106 and the weight-side rack 117 in a case where the pinion 107 is rotatably driven in one rotation direction is indicated by a dashed arrow.

The power inputter 108 is an outer portion of the table displacement mechanism 103, specifically a portion configured to input rotary drive force from a table displacement mechanism drive apparatus 130. The power inputter 108 includes a not-shown power transmission mechanism in a housing projecting from an outer surface of the guide support side wall 104. In this case, the power transmission mechanism includes a mechanical element for transmitting the rotary drive force from the table displacement mechanism drive apparatus 130 to the above-described rack-and-pinion mechanism.

In the present embodiment, the power transmission mechanism includes, for example, an input tube provided with an internal spline to be fitted in an input shaft 131 of the table displacement mechanism drive apparatus 130, a reduction gear mechanism configured to reduce the number of rotations of the input tube, and the output shaft 108a of the reduction gear mechanism including the pinion 107. The power inputter 108 is formed such that the input tube provided with the internal spline opens to face the input shaft 131 of the table displacement mechanism drive apparatus 130.

A weight holding tool 110 is a group of parts configured to detachably hold a counter weight 111. The weight holding tool 110 mainly includes each of a weight holding table 112 and clamps 113. The counterweight 111 is a part for equilibrating unbalanced centrifugal force acting upon rotary drive of the work table 101 holding the work piece WK. The counter weight 111 is formed to have a mass equal or close to that of the work table 101 holding the work piece WK. In this case, the counterweight Ill does not necessarily have the same mass as that of the work table 101 holding the work piece WK, and it is enough that the counter weight 111 is formed to have such a mass that the unbalanced centrifugal force can be reduced. In the present embodiment, the counter weight 111 is formed in such a manner that a metal material having a greater specific weight than that of the work table 101 holding the work piece WK is formed into a rectangular parallelepiped shape.

The weight holding table 112 is a part configured to detachably hold the counterweight Ill in cooperation with the clamps 113. The weight holding table 112 is formed in such a manner that a cast material is formed into a flat plate shape. In the present embodiment, the weight holding table 112 is, as viewed in plane, formed in a rectangular shape extending in the X-axis direction as viewed in the figure. The weight holding table 112 is, between two guide support side walls 104 below the work table 101, supported in a horizontal state on a weight displacement mechanism 114.

The clamp 113 is a part for fixing, onto the weight holding table 112, the counter weight 111 placed on the weight holding table 112. As in the clamp 102, the clamp 113 includes a hydraulic clamp of which claw configured to hold part of the counter weight 111 is to be driven by a hydraulic pressure. In the present embodiment, four clamps 113 are provided on the weight holding table 112.

The weight displacement mechanism 114 is a mechanical apparatus for linearly reciprocatably displacing the weight holding table 112 in a direction which is opposite to a displacement direction of the work table 101 in the X-axis direction as viewed in the figure. The weight displacement mechanism 114 mainly includes each of a guide support base 115, the weight-side rack 117, and the pinion 107. The guide support base 115 is a part configured to support the weight holding table 112 through a linear guide 116. The guide support base 115 is formed in such a manner that a cast material is formed into a flat plate shape. In the present embodiment, the guide support base 115 is, as viewed in plane, formed in a rectangular shape extending in the X-axis direction as viewed in the figure. The guide support base 115 is fixed onto the rotation base 120.

As in the linear guide 105, the linear guide 116 is a part configured to support the weight holding table 112 such that the weight holding table 112 is slidable in the X-axis direction as viewed in the figure. The linear guide 116 includes a rail provided on an upper surface of the guide support base 115, and a slider provided on a lower surface of the weight holding table 112 to slide on the rail.

The weight-side rack 117 and the pinion 107 are parts configured to reciprocatably displace the weight holding table 112 in a direction in the X-axis direction as viewed in the figure, the direction being opposite to a reciprocatable displacement direction of the work table 101 in the X-axis direction as viewed in the figure. More specifically, the weight-side rack 117 is configured such that teeth configured to engage with the pinion 107 are linearly formed on a plate-shaped body extending linearly. The weight-side rack 117 is provided to extend in the longitudinal direction at a position facing the table-side rack 106 on an upper surface of the weight holding table 112. That is, the pinion 107 and the table-side rack 106 together form the rack-and-pinion mechanism. Further, the pinion 107 and the weight-side rack 117 together form a rack-and-pinion mechanism configured to displace in a direction which is opposite to a displacement direction of the table-side rack 106 in the X-axis direction as viewed in the figure.

The rotation base 120 is a part configured to rotatably support each of the table displacement mechanism 103 and the weight displacement mechanism 114. The rotation base 120 includes a cast in such a shape that a flat plate body is supported above a discoid body. The rotation base 120 supports, by an upper surface thereof, two guide support side walls 104 and the single guide support base 115. Further, a lower surface of the rotation base 120 is placed on a pulley body 121 in a fixed manner. Moreover, a projecting body 122 is, at the rotation base 120, provided to project leftward in the X-axis direction as viewed in the figure. The table-side inputter/outputter 126 is provided at the projecting body 122. Moreover, a rotary encoder 120a is provided inside the rotation base 120.

The rotary encoder 120a is a detector configured to electrically detect the position of the rotation base 120 in a rotary drive direction thereof to output an electrical signal corresponding to such a position. The rotary encoder 120a is electrically connected to the control apparatus 150 through each of the table-side inputter/outputter 126 and the body-side inputter/outputter 127. With this configuration, the control apparatus 150 can execute continuous rotary drive of the rotation base 120 and rotary drive for which a stop position in the rotary drive direction is specified.

The pulley body 121 is a part for rotatably driving the rotation base 120. The pulley body 121 is formed in such a manner that a cast material is formed into a cylindrical shape. The pulley body 121 is supported to stand on a base (not shown) of the work processing apparatus 100 in a state in which the pulley body 121 is rotatable through a support bearing 123. Moreover, the pulley body 121 is coupled to a table rotary drive motor 125 through a belt 124. The belt 124 is a part disposed between the pulley body 121 and the table rotary drive motor 125 to transmit rotary drive force of the table rotary drive motor 125 to the pulley body 121. The belt 124 is formed in such a manner that a flat plate-shaped rubber material is formed into an annular shape. In this case, internal teeth are formed at an inner surface of the belt 124. These internal teeth engage with external teeth formed at each of an outer peripheral surface of the pulley body 121 and an outer peripheral surface of an output shaft (not shown) of the table rotary drive motor 125.

The table rotary drive motor 125 is an electric motor configured to generate the rotary drive force for rotatably driving the rotation base 120 through the pulley body 121. In the present embodiment, the table rotary drive motor 125 includes a servo motor of which actuation is controlled by the control apparatus 150. The table rotary drive motor 125 is supported to stand at a position adjacent to the pulley body 121 on the base (not shown) of the work processing apparatus 100.

The table-side inputter/outputter 126 is a physical electrical connector for performing hydraulic pressure supply and electrical signal transmission/reception between the table-side inputter/outputter 126 and the body-side inputter/outputter 127 to perform supply to the clamps 102, the clamps 113, the linear scale 104a, and the rotary encoder 120a. In the present embodiment, the table-side inputter/outputter 126 includes joint fittings 126a, 126b physically coupled to joint fittings 127a, 127b of the body-side inputter/outputter 127, and an electric transmission coupler 126c electrically connected to an electric transmission coupler 127c of the body-side inputter/outputter 127 without contact. In this case, the joint fittings 126a, 126b are coupled to the clamps 102, 113 through a pipe (not shown). Moreover, the electric transmission coupler 126c is connected to each of the linear scale 104a and the rotary encoder 120a through electric wiring (not shown).

The body-side inputter/outputter 127 is a physical electrical connector for performing hydraulic pressure supply and electrical signal transmission/reception between the body-side inputter/outputter 127 and the table-side inputter/outputter 126 to perform supply to the clamps 102, the clamps 113, the linear scale 104a, and the rotary encoder 120a. In the present embodiment, the body-side inputter/outputter 127 includes the joint fittings 127a, 127b physically coupled to the joint fittings 126a, 126b of the table-side inputter/outputter 126, and the electric transmission coupler 127c electrically connected to the electric transmission coupler 126c of the table-side inputter/outputter 126 without contact.

In this case, each of the joint fittings 127a, 127b is, through a pipe (not shown), coupled to a hydraulic pump (not shown) of which actuation is controlled by the control apparatus 150 in the work processing apparatus 100. Moreover, the electric transmission coupler 127c is connected to the control apparatus 150 through electric wiring (not shown). The body-side inputter/outputter 127 is supported on an inputter/outputter displacement apparatus 128.

The inputter/outputter displacement apparatus 128 is a mechanical apparatus for causing the body-side inputter/outputter 127 to approach or separate from the table-side inputter/outputter 126 to connect the body-side inputter/outputter 127 to the table-side inputter/outputter 126 or disconnect the body-side inputter/outputter 127 from the table-side inputter/outputter 126. In the present embodiment, the inputter/outputter displacement apparatus 128 includes a hydraulic cylinder. In the hydraulic cylinder, a piston moves up and down by a hydraulic pressure generated by a hydraulic pump (not shown) of which actuation is controlled by the control apparatus 150. The inputter/outputter displacement apparatus 128 is supported on the base (not shown) of the work processing apparatus 100.

The table displacement mechanism drive apparatus 130 is a motor configured to reciprocatably displace each of the work table 101 and the weight holding tool 110 in the X-axis direction as viewed in the figure. In the present embodiment, the table displacement mechanism drive apparatus 130 includes a servo motor of which actuation is controlled by the control apparatus 150. The input shaft 131 spline-fitted in the above-described input tube of the power transmission mechanism built in the power inputter 108 is provided at an output shaft of the table displacement mechanism drive apparatus 130. The table displacement mechanism drive apparatus 130 is, in a horizontal orientation, supported on a drive source displacement apparatus 132 at such a position that the input shaft 131 faces the input tube in the power inputter 108.

The drive source displacement apparatus 132 is a mechanical apparatus for causing the table displacement mechanism drive apparatus 130 to approach or separate from the power inputter 108 to connect the table displacement mechanism drive apparatus 130 to the power inputter 108 or disconnect the table displacement mechanism drive apparatus 130 from the power inputter 108. The drive source displacement apparatus 132 mainly includes each of a guide 133, a guide drive apparatus 134, and a support 135.

The guide 133 is a part for causing the table displacement mechanism drive apparatus 130 to approach or separate from the power inputter 108 and guiding the table displacement mechanism drive apparatus 130 in the X-axis direction as viewed in the figure. The guide 133 includes, in a housing, a feed screw mechanism (not shown) extending in the X-axis direction as viewed in the figure. The guide 133 supports the table displacement mechanism drive apparatus 130 through an angle rest formed in an L-shape.

The guide drive apparatus 134 is a motor configured to cause the table displacement mechanism drive apparatus 130 to approach or separate from the power inputter 108 and reciprocatably displace the table displacement mechanism drive apparatus 130 in the X-axis direction as viewed in the figure. In the present embodiment, the guide drive apparatus 134 includes a servo motor of which actuation is controlled by the control apparatus 150. The guide drive apparatus 134 is coupled to and supported on one end portion of the guide 133 in the longitudinal direction. The guide drive apparatus 134 rotatably drives the feed screw mechanism in the guide 133, thereby displacing the table displacement mechanism drive apparatus 130 in the X-axis direction as viewed in the figure.

The support 135 is a part configured to support the table displacement mechanism drive apparatus 130, the guide 133, and the guide drive apparatus 134, The support 135 includes a metal plate-shaped body. The support 135 is supported to stand on the base (not shown) of the work processing apparatus 100.

The processing head 140 is a mechanical apparatus for performing the thermal spray processing for the work piece WK held on the work table 101. The processing head 140 includes a thermal spray nozzle 141. The thermal spray nozzle 141 is a part configured to spray, in a molten or semi-molten state, a thermal spray material such as a metal material, a ceramic material, or cermet. In the present embodiment, the processing head 140 sprays, from the thermal spray nozzle 141, particles obtained in such a manner that the thermal spray material is brought into the molten or semi-molten state by means of laser light. That is, the processing head 140 is connected to a laser light source (not shown) configured to output the laser light and a material supply apparatus (not shown) configured to supply the thermal spray material. The processing head 140 is, by a head support mechanism 142 included in the work processing apparatus 100, supported above the work table 101.

The head support mechanism 142 is a mechanical apparatus configured to displace the processing head 140 in each of a Y-axis direction and a Z-axis direction perpendicular to the X-axis direction as viewed in the figure. In this case, the Y-axis direction as viewed in the figure is a direction perpendicular to the X-axis direction as viewed in the figure in the same horizontal plane including the X-axis direction as viewed in the figure. The Z-axis direction as viewed in the figure is a direction (i.e., an upper-lower direction as viewed in the figure) perpendicular to the X-axis direction as viewed in the figure in the same vertical plane including the X-axis direction as viewed in the figure. Actuation of the head support mechanism 142 is controlled by the control apparatus 150.

The control apparatus 150 includes a microcomputer having a CPU, a ROM, a RAM and the like. The control apparatus 150 controls actuation of the entirety of the work processing apparatus 100 in a comprehensive manner. Further, the control apparatus 150 executes a not-shown processing program (a so-called numerical control (NC) program) prepared by an operator to perform the thermal spray processing for the work piece WK.

Specifically, the control apparatus 150 controls actuation of each of the table rotary drive motor 125, the inputter/outputter displacement apparatus 128, the table displacement mechanism drive apparatus 130, the guide drive apparatus 134, and the head support mechanism 142 while acquiring each detection signal from the linear scale 104a and the rotary encoder 120a, thereby performing the thermal spray processing for the work piece WK on the work table 101. In this case, the control apparatus 150 also controls actuation of each of the above-described laser light source and the above-described material supply apparatus, thereby performing the thermal spray processing for the work piece WK.

An operation panel 151 is connected to the control apparatus 150. The operation panel 151 includes an input apparatus configured to receive an instruction from the operator to input such an instruction to the control apparatus 150 and having a switch group, and a liquid crystal display apparatus configured to display an actuation status of the control apparatus 150. The operation panel 151 is provided at an exterior cover (not shown) forming an outer surface of the work processing apparatus 100. The exterior cover described herein includes a metal plate covering the periphery of the work table 101.

Note that the work processing apparatus 100 also includes, for example, a power supply configured to supply electricity for actuating each of the table rotary drive motor 125, the inputter/outputter displacement apparatus 128, the table displacement mechanism drive apparatus 130, the guide drive apparatus 134, the head support mechanism 142, the above-described laser light source, the above-described material supply apparatus, and the control apparatus 150, and an external interface for electrically connecting external equipment to the control apparatus 150. These configurations do not directly relate to the present invention, and therefore, description thereof will be omitted.

(Actuation of Work Processing Apparatus 100)

Next, actuation of the work processing apparatus 100 configured as described above will be described. The work processing apparatus 100 is arranged independently or incorporated into a processing line in a factory for processing the work piece WK, thereby implementing one step of processing the work piece WK. In the present embodiment, only matters regarding the steps of the thermal spray processing for the work piece WK will be described. Description of other processing steps not directly relating to the present invention will be omitted.

First, the operator operates the operation panel 151 to power on the work processing apparatus 100. Accordingly, the work processing apparatus 100 executes a not-shown predetermined control program stored in advance in the ROM of the control apparatus 150 to return each of the work table 101 and the processing head 140 to an original point.

Figure 4:
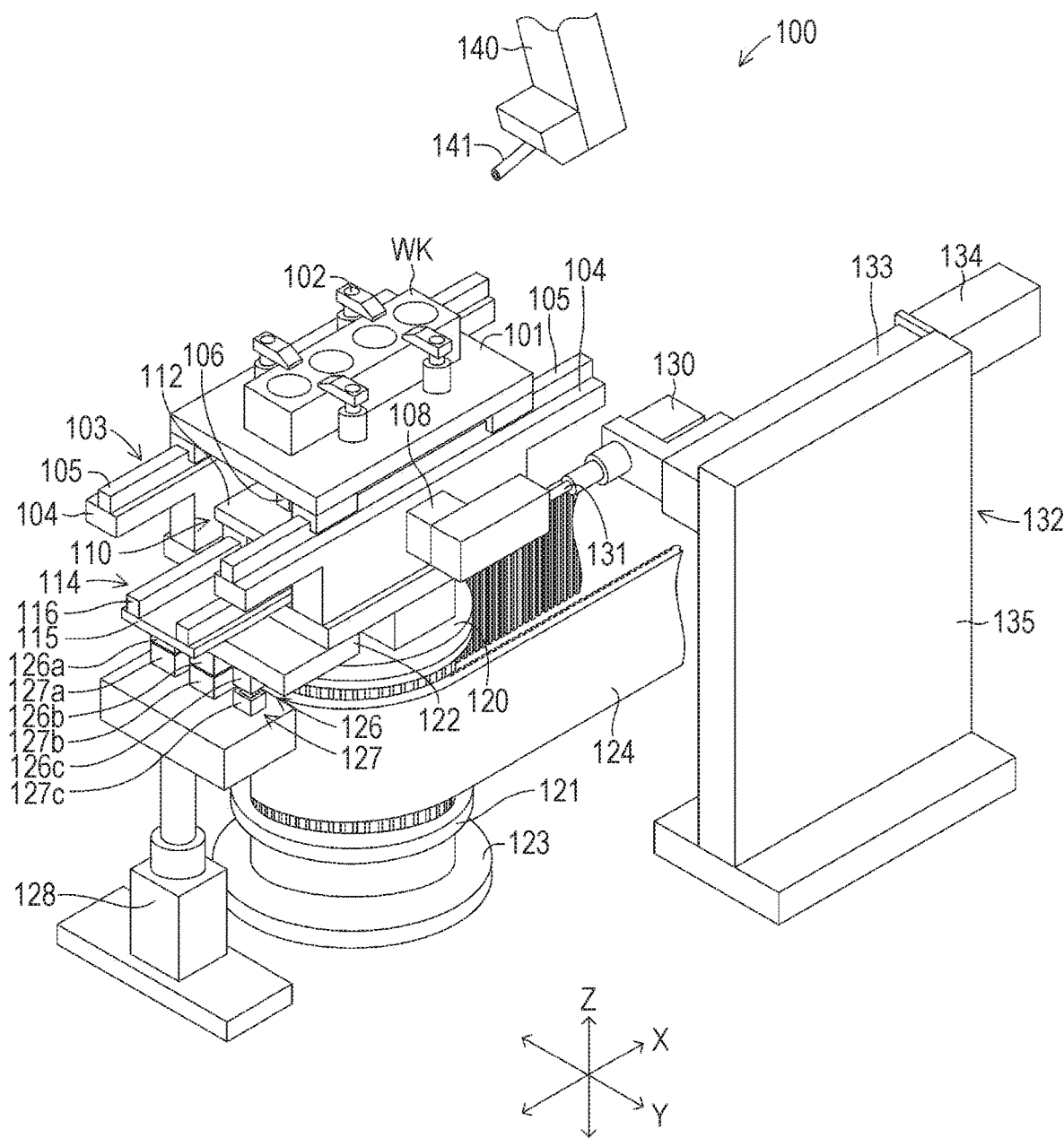
FIG. 4 is a perspective view schematically illustrating the outline of the external configuration of the work processing apparatus illustrated in FIG. 1 in a state in which a table rotary drive motor is connected to a table displacement mechanism through a power inputter and a body-side inputter/outputter is connected to a table-side inputter/outputter.

Specifically, the control apparatus 150 controls actuation of the table rotary drive motor 125 to rotate the rotation base 120, thereby position-determining the power inputter 108 to such an orientation that the power inputter 108 faces the table displacement mechanism drive apparatus 130. In this case, the table-side inputter/outputter 126 is also position-determined to such an orientation that the table-side inputter/outputter 126 faces the body-side inputter/outputter 127 (see FIG. 1). Next, as illustrated in FIG. 4, the control apparatus 150 controls actuation of the inputter/outputter displacement apparatus 128 to lift the body-side inputter/outputter 127, thereby connecting the body-side inputter/outputter 127 to the table-side inputter/outputter 126. Accordingly, the control apparatus 150 can control actuation of the clamps 102, 113, and can detect the position of the work table 101 in the X-axis direction as viewed in the figure. Note that in FIG. 1, one (on a near side as viewed in the figure) of two guide support side walls 104 and the linear guides 105 are illustrated in a partially-broken state.

Next, the control apparatus 150 controls actuation of the guide drive apparatus 134 to advance the table displacement mechanism drive apparatus 130 to a power inputter 108 side and connect the table displacement mechanism drive apparatus 130 to the power inputter 108 (see FIG. 4). Accordingly, the table displacement mechanism drive apparatus 130 is coupled to each rack-and-pinion mechanism in the table displacement mechanism 103 and the weight displacement mechanism 114, and the work processing apparatus 100 is brought into a state in which the work table 101 and the weight holding tool 110 can be displaced in the X-axis direction as viewed in the figure by the control apparatus 150.

Next, the control apparatus 150 controls actuation of the table displacement mechanism drive apparatus 130 to position-determine the work table 101 and the weight holding tool 110 to a center position in a movable area in the X-axis direction as viewed in the figure (see FIG. 4). Moreover, the control apparatus 150 controls actuation of the head support mechanism 142, thereby position-determining the processing head 140 to a position most apart from the work table 101. Accordingly, the control apparatus 150 can position-determine each of the work table 101 and the processing head 140 to an original point position, and is brought into a standby state in which the control apparatus 150 waits for the instruction from the operator.

Next, the operator places the work piece WK on the work table 101 and operates the operation panel 151 to actuate the clamps 102, and in this manner, fixes the work piece WK onto the work table 101. Next, the operator exposes the weight holding table 112 for the purpose of setting the counter weight 111 on the weight holding table 112. Specifically, the operator operates the operation panel 151 to displace the work table 101 to one limit position in the movable area in the X-axis direction as viewed in the figure (see FIG. 1). In this case, the weight holding table 112 is, by the weight displacement mechanism 114, displaced in a direction opposite to the work table 101. Thus, the weight holding table 112 is displaced to the other limit position in the movable area in the X-axis direction as viewed in the figure to be exposed through the worktable 101.

In this manner, the operator places the counter weight 111 on the weight holding table 112. Further, the operator operates the operation panel 151 to actuate the clamps 113, and in this manner, fixes the counter weight 111 onto the weight holding table 112. In this case, the operator determines, as necessary, the mass of the counter weight Ill and the position of the counter weight 111 on the weight holding table 112 according to the magnitude of centrifugal force which is to be generated by rotary drive of the counter weight 11. Note that it is enough that the process of setting the counter weight 111 is performed once at the beginning in the case of processing multiple identical work pieces WK.

Next, the operator operates the operation panel 151 to instruct the control apparatus 150 to start the thermal spray processing for the work piece WK. In response to such an instruction, the control apparatus 150 executes a not-shown thermal spray processing control program to execute the thermal spray processing for the work piece WK.

First, the control apparatus 150 controls actuation of the table displacement mechanism drive apparatus 130 to position-determine the position of a rotation center axis upon processing of the work piece WK to the position of the rotation center axis of the rotation base 120. In the present embodiment, the center position of a first one of four cylinders formed at the cylinder block forming the work piece WK is position-determined to the position of the rotation center axis of the rotation base 120. Accordingly, the weight holding table 112 holding the counter weight Ill is, by the weight displacement mechanism 114, position-determined to a position displaced to the opposite side of the work table 101 by the same amount as that of the work table 101.

Next, the control apparatus 150 controls actuation of the head support mechanism 142 to position-determine the thermal spray nozzle 141 of the processing head 140 to a processing target position on the work piece WK. Next, the control apparatus 150 controls actuation of the guide drive apparatus 134, thereby retreating the table displacement mechanism drive apparatus 130 in the direction of separating from the power inputter 108 and separating the table displacement mechanism drive apparatus 130 (see FIG. 1). In this case, the table displacement mechanism drive apparatus 130 retreats to such a position that the table displacement mechanism drive apparatus 130 does not physically contact a part rotatably driven together with the rotation base 120 by, e.g., rotary drive of the rotation base 120, such as the work table 101. Accordingly, the positions of the work table 101 and the weight holding table 112 are fixed. Note that in FIG. 1, the processing head 140 position-determined to the processing target position on the work piece WK is indicated by a chain double-dashed line.

Moreover, the control apparatus 150 controls actuation of the inputter/outputter displacement apparatus 128, thereby lowering the body-side inputter/outputter 127 and separating the body-side inputter/outputter 127 from the table-side inputter/outputter 126 (see FIG. 1). Accordingly, holding of the work piece WK and the counter weight 111 by the clamps 102, 113 is fixed.

Next, the control apparatus 150 controls actuation of the table rotary drive motor 125 to rotatably drive the rotation base 120. Further, the control apparatus 150 causes the thermal spray nozzle 141 of the processing head 140 to spray the thermal spray material, thereby starting the thermal spray processing. In this case, the table displacement mechanism drive apparatus 130 and the body-side inputter/outputter 127 are each separated from the power inputter 108 and the table-side inputter/outputter 126, and therefore, the control apparatus 150 can freely set or change a rotation direction of the rotation base 120 and the number of rotations of the rotation base 120. Note that in FIG. 1, one example of rotary drive directions of the work table 101, the table displacement mechanism 103, the weight holding tool 110, and the weight displacement mechanism 114 supported on the rotation base 120 is indicated by dashed arrows.

In the present embodiment, the control apparatus 150 can rotate the rotation base 120 at a speed of 500 rpm. Moreover, in this case, the rotation base 120 is position-determined to such a position that the center of gravity of the work piece WK is eccentric with the rotation center axis. However, balance with the work piece WK is ensured by the counter weight 111, and therefore, the rotation base 120 can be stably rotatably driven.

Next, when the thermal spray processing for the first cylinder of the work piece WK ends, the control apparatus 150 stops spraying of the thermal spray material from the thermal spray nozzle 141. Further, the control apparatus 150 controls actuation of the head support mechanism 142 to temporarily retreat the processing head 140 from the work piece WK. Moreover, the control apparatus 150 controls actuation of the table rotary drive motor 125 to stop rotary drive of the rotation base 120. In this case, the control apparatus 150 controls actuation of the table rotary drive motor 125 such that the power inputter 108 is stopped at a position facing the table displacement mechanism drive apparatus 130.

Next, the control apparatus 150 controls, as in description above, actuation of the inputter/outputter displacement apparatus 128 and the guide drive apparatus 134, thereby connecting the body-side inputter/outputter 127 to the table-side inputter/outputter 126 and connecting the table displacement mechanism drive apparatus 130 to the power inputter 108. Then, the control apparatus 150 controls actuation of the table displacement mechanism drive apparatus 130 to position-determine the position of the rotation center axis upon processing of a subsequent processing target portion of the work piece WK to the position of the rotation center axis of the rotation base 120.

In the present embodiment, the center position of a second one of four cylinders formed at the cylinder block forming the work piece WK is position-determined to the position of the rotation center axis of the rotation base 120.

Accordingly, the weight holding table 112 holding the counter weight 1/1 is, by the weight displacement mechanism 114, position-determined to a position displaced to the opposite side of the work table 101 by the same amount as that of the work table 101.

Next, the control apparatus 150 controls actuation of the head support mechanism 142 to position-determine the thermal spray nozzle 141 of the processing head 140 to the processing target position on the work piece WK. Moreover, the control apparatus 150 controls actuation of the guide drive apparatus 134 to separate the table displacement mechanism drive apparatus 130 from the power inputter 108. Further, the control apparatus 150 controls actuation of the inputter/outputter displacement apparatus 128 to separate the body-side inputter/outputter 127 from the table-side inputter/outputter 126. Then, the control apparatus 150 performs, as in description above, the thermal spray processing for a subsequent processing target position on the work piece WK. That is, the control apparatus 150 performs the thermal spray processing for all processing target positions while position-determining the work piece WK for each processing target position on the work piece WK.

Next, when the thermal spray processing for all processing target positions on the work piece WK ends, the control apparatus 150 returns each of the work table 101 and the processing head 140 to the original point. Accordingly, the operator operates the operation panel 151 to cancel a fixed state of the work piece WK by the clamps 102, and therefore, can remove the work piece WK from the work table 101. Then, in the case of performing the thermal spray processing for a subsequent work piece WK, the operator fixes the subsequent work piece WK onto the work table 101 as in description above.

In the case of removing the counter weight 111 from the weight holding table 112, the operator operates the operation panel 151 to expose the weight holding table 112 as in description above and cancel a fixed state by the clamps 113. Accordingly, the operator can remove the counter weight 111 from the weight holding table 112. In this manner, the operator can end the thermal spray processing for the work piece WK, or can perform the thermal spray processing for a new work piece WK in a different shape.

As can be understood from description of actuation above, according to the above-described embodiment, the work processing apparatus 100 is configured to connect the table displacement mechanism drive apparatus 130 providing drive force to the table displacement mechanism 103 to the table displacement mechanism 103 supported on the rotation base 120 or disconnect the table displacement mechanism drive apparatus 130 from the table displacement mechanism 103 by the drive source displacement apparatus 132. Thus, the work table 101 can be rotated without the need for considering wiring of the table displacement mechanism drive apparatus 130. As a result, the work processing apparatus 100 according to the present invention can perform forward or reverse rotation of the work table 101 more than once, and can perform high-speed rotation of the worktable 101. Thus, limitations on the contents of the processing for the work piece WK or the type of work piece WK can be reduced, and processing for a wider range of processing contents and work piece WK can be performed.

Further, implementation of the present invention is not limited to the above-described embodiment, and various changes can be made without departing from the object of the present invention.

For example, in the configuration according to the above-described embodiment, the rotary drive force of the table rotary drive motor 125 is transmitted to the pulley body 121 through the belt 124 to rotatably drive the rotation base 120 fixed onto the pulley body 121. In this manner, the work table 101 and the table displacement mechanism 103 are integrally rotatably driven. That is, the table rotary drive motor 125, the belt 124, the pulley body 121, and the rotation base 120 are equivalent to a table rotary drive apparatus according to the present invention. However, it is enough that the table rotary drive apparatus is configured to support the work table 101 and the table displacement mechanism 103 so that the work table 101 and the table displacement mechanism 103 can be integrally rotatably driven. Thus, the table rotary drive apparatus can be, for example, also configured such that the table rotary drive motor 125 is arranged at the position of the pulley body 121 and the rotation base 120 is directly attached onto the output shaft of the table rotary drive motor 125. With this configuration, the configuration of the work processing apparatus 100 can be simplified and downsized.

Moreover, in the above-described embodiment, the table displacement mechanism 103 is configured to displace the work table 101 in the X-axis direction as viewed in the figure. However, it is enough that the table displacement mechanism 103 is configured to displace the work table 101 in a direction perpendicular to the Z-axis direction as an arrangement direction of the processing head 140. Thus, the table displacement mechanism 103 may be configured to displace the work table 101 in each of the X-axis direction and the Y-axis direction perpendicular to the Z-axis direction as the arrangement direction of the processing head 140.

Further, in the above-described embodiment, the work table 101 is formed in a quadrangular flat plate shape as viewed in plane. However, it is enough that the work table 101 is configured to detachably hold the work piece WK. Thus, the worktable 101 can be, for example, configured to hold the work piece WK with two claws or three or more claws.

In addition, in the above-described embodiment, the table displacement mechanism 103 and the weight displacement mechanism 114 include the rack-and-pinion mechanisms. However, it is enough that the table displacement mechanism 103 and the weight displacement mechanism 114 are each configured to displace the work table 101 and the weight holding table 112. Thus, the table displacement mechanism 103 and the weight displacement mechanism 114 can include feed screw mechanisms or ball screw mechanisms, for example.

Moreover, in the above-described embodiment, the drive source displacement apparatus 132 is configured to reciprocatably displace the table displacement mechanism drive apparatus 130 in the X-axis direction as viewed in the figure. However, it is enough that the drive source displacement apparatus 132 is configured to cause the table displacement mechanism drive apparatus 130 to approach or separate from the table displacement mechanism 103 to connect the table displacement mechanism drive apparatus 130 to the table displacement mechanism 103 or disconnect the table displacement mechanism drive apparatus 130 from the table displacement mechanism 103. Thus, the drive source displacement apparatus 132 can be, for example, also configured to reciprocatably displace the table displacement mechanism drive apparatus 130 in the Y-axis direction as viewed in the figure and the Z-axis direction as viewed in the figure instead of or in addition to the X-axis direction as viewed in the figure.

Further, in the above-described embodiment, the work processing apparatus 100 includes the weight holding tool 110 and the weight displacement mechanism 114. However, in a case where the counter weight 111 is not necessary, such as a case where the centrifugal force upon rotation of the work piece WK is ignorably small, the work processing apparatus 100 can be configured without each of the weight holding tool 110 and the weight displacement mechanism 114. Moreover, in a case where the position of the counter weight 111 is fixed and unchanged, the work processing apparatus 100 can be configured without the weight displacement mechanism 114.

In addition, in the above-described embodiment, the weight displacement mechanism 114 is driven by the table displacement mechanism drive apparatus 130. However, the weight displacement mechanism 114 may be driven by a drive source separated from the table displacement mechanism drive apparatus 130, such as an electric motor.

Moreover, in the above-described embodiment, the work processing apparatus 100 includes each of the table-side inputter/outputter 126 and the body-side inputter/outputter 127. However, in a case where supply of a hydraulic pressure, a pneumatic pressure, or power to the work table 101, the table displacement mechanism 103, the weight holding tool 110, and the weight displacement mechanism 114 or electrical signal transmission/reception for the work table 101, the table displacement mechanism 103, the weight holding tool 110, and the weight displacement mechanism 114 is not necessary, the work processing apparatus 100 can be configured without the table-side inputter/outputter 126 and the body-side inputter/outputter 127. For example, in the work processing apparatus 100, the clamps 102, 113 for fixing the work piece WK and the counter weight 111 or canceling such fixing by manual operation are used so that the joint fittings 126a, 126b, 127a, 127b can be omitted.

Further, in the above-described embodiment, the table-side inputter/outputter 126 and the body-side inputter/outputter 127 are configured to perform hydraulic pressure supply and electrical signal transmission/reception for the work table 101, the table displacement mechanism 103, and the weight holding tool 110. However, it is enough that the table-side inputter/outputter 126 and the body-side inputter/outputter 127 are configured to perform hydraulic pressure supply, pneumatic pressure supply, or power supply or electrical signal transmission/reception necessary for the work table 101, the table displacement mechanism 103, the weight holding tool 110, and the weight displacement mechanism 114.

Thus, the table-side inputter/outputter 126 and the body-side inputter/outputter 127 may be configured to actuate, with the pneumatic pressure, the clamps 102, 113 by pneumatic pressure supply. Alternatively, the table-side inputter/outputter 126 and the body-side inputter/outputter 127 may be configured to actuate an electric motor by power supply to drive the weight displacement mechanism 114.

In addition, in the above-described embodiment, the control apparatus 150 controls, when stopping rotary drive of the work table 101, actuation of the table rotary drive motor 125 such that the power inputter 108 as a portion of the table displacement mechanism 103 connected to the table displacement mechanism drive apparatus 130 is stopped at a position facing the input shaft 131 as a portion of the table displacement mechanism drive apparatus 130 connected to the table displacement mechanism 103. However, the control apparatus 150 may control, when stopping rotary drive of the work table 101, actuation of the table rotary drive motor 125 such that the power inputter 108 of the table displacement mechanism 103 is stopped at other positions than the position facing the input shaft 131 of the table displacement mechanism drive apparatus 130. In this case, the control apparatus 150 may position-determine, when coupling the table displacement mechanism drive apparatus 130 to the table displacement mechanism 103, the power inputter 108 of the table displacement mechanism 103 to the position facing the input shaft 131 of the table displacement mechanism drive apparatus 130 by control of actuation of the table rotary drive motor 125.

Moreover, in the above-described embodiment, the weight holding tool 110 is arranged between the rotation base 120 forming the table rotary drive apparatus and the work table 101. However, the weight holding tool 110 may be provided adjacent to the work table 101 in the same plane as that of the work table 101. Alternatively, the weight holding tool 110 may be provided above the work table 101.

Further, in the above-described embodiment, the work processing apparatus 100 is configured to perform the thermal spray processing for the work piece WK. However, the work processing apparatus 100 may be configured to perform processing other than the thermal spray processing, such as clad processing, for the work piece WK. In this case, the work processing apparatus 100 may include a nozzle (not shown) configured to spray metal powder to the processing head 140 and irradiate laser light for melting the metal powder. Moreover, the work processing apparatus 100 can perform removal processing, cutting processing, or welding processing by means of laser light. That is, the work processing apparatus can be broadly applied to a laser processing apparatus configured to process a work piece by means of laser light. Alternatively, the work processing apparatus 100 may be configured to perform the cutting processing for the work piece WK. In this case, the work processing apparatus 100 may be configured to hold, by the processing head 140, a blade (not shown) for cutting the work piece WK.

LIST OF REFERENCE NUMERALS

WK work piece
100 work processing apparatus
101 work table
102 clamp
103 table displacement mechanism
104 guide support side wall
104a linear scale
105 linear guide
106 table-side rack
107 pinion
108 power inputter
108a output shaft
110 weight holding tool
111 counter weight
112 weight holding table
113 clamp
114 weight displacement mechanism
115 guide support base
116 linear guide
117 weight-side rack
120 rotation base
120a rotary encoder
121 pulley body
122 projecting body
123 support bearing
124 belt
125 table rotary drive motor
126 table-side inputter/outputter
126a, 126b joint fitting
126c electric transmission coupler
127 body-side inputter/outputter
127a, 127b joint fitting
127c electric transmission coupler
128 inputter/outputter displacement apparatus
130 table displacement mechanism drive apparatus
131 input shaft
132 drive source displacement apparatus
133 guide
134 guide drive apparatus
135 support
140 processing head
141 thermal spray nozzle
142 head support mechanism
150 control apparatus
151 operation panel

What is claimed is:

1. A work processing apparatus including
a work table arranged facing a processing head configured to perform processing for a work piece and configured to hold the work piece,
a table displacement mechanism configured to displace the work table in a direction perpendicular to an arrangement direction of the processing head,
a table displacement mechanism drive apparatus configured to generate drive force for driving the table displacement mechanism,
a table rotary drive apparatus configured to support the work table and the table displacement mechanism such that the work table and the table displacement mechanism are integrally rotatably drivable, and
a control apparatus configured to control actuation of each of the table displacement mechanism drive apparatus and the table rotary drive apparatus, comprising:
a drive source displacement apparatus configured to cause the table displacement mechanism drive apparatus to approach or separate from the table displacement mechanism to connect the table displacement mechanism drive apparatus to the table displacement mechanism or disconnect the table displacement mechanism drive apparatus from the table displacement mechanism, wherein
the table displacement mechanism drive apparatus is connected to the table displacement mechanism while the table displacement mechanism determines a position of the work piece, and
the table displacement mechanism drive apparatus is disconnected from the table displacement mechanism while the work piece is processed by the processing head.

2. The work processing apparatus according to claim 1, wherein
the table rotary drive apparatus further supports a weight holding tool such that the weight holding tool is rotatably drivable, and
the weight holding tool holds a counter weight on an opposite side of a rotation center axis of the table rotary drive apparatus from a position of the work table.

3. The work processing apparatus according to claim 2, further comprising:
a weight displacement mechanism configured to displace the weight holding tool in a radial direction with respect to the rotation center axis of the table rotary drive apparatus.

4. The work processing apparatus according to claim 3, wherein
the weight displacement mechanism is driven by the table displacement mechanism drive apparatus.

5. The work processing apparatus according to claim 3, wherein
the weight holding tool is arranged between the table rotary drive apparatus and the work table.

6. The work processing apparatus according to claim 1, further comprising:
a table-side inputter/outputter provided at the table rotary drive apparatus to input/output at least one of a hydraulic pressure, a pneumatic pressure, power, or an electrical signal;
a body-side inputter/outputter configured to input the at least one of the hydraulic pressure, the pneumatic pressure, the power, or the electrical signal to the table-side inputter/outputter or output the at least one of the hydraulic pressure, the pneumatic pressure, the power, or the electrical signal from the table-side inputter/outputter; and an inputter/outputter displacement apparatus configured to cause the body-side inputter/outputter to approach or separate from the table-side inputter/outputter to connect the body-side inputter/outputter to the table-side inputter/outputter or disconnect the body-side inputter/outputter from the table-side inputter/outputter.

7. The work processing apparatus according to claim 1, wherein the control apparatus
controls, when stopping rotary drive of the work table rotatably driven by the table rotary drive apparatus, actuation of the table rotary drive apparatus such that a portion of the table displacement mechanism connected to the table displacement mechanism drive apparatus is stopped at a position facing a portion of the table displacement mechanism drive apparatus connected to the table displacement mechanism.

8. The work processing apparatus according to claim 1, wherein
the table displacement mechanism comprises a power inputter, and
the drive source displacement apparatus is configured to cause the table displacement mechanism drive apparatus to approach or separate from the power inputter to connect the table displacement mechanism drive apparatus to the power inputter or disconnect the table displacement mechanism drive apparatus from the power inputter.

9. The work processing apparatus according to claim 1, wherein
the table displacement mechanism drive apparatus comprises an input shaft including a pinion, and
the table displacement mechanism comprises a power inputter that comprises an input tube that comprises a spline that fits the pinion of the input shaft.

10. The work processing apparatus according to claim 9, wherein
the input shaft is supported in a horizontal orientation facing a front opening of the input tube,
the table displacement mechanism drive apparatus horizontally moves the input shaft toward the opening of the input tube until the pinion fits the spline or moves the input shaft back from the input tube until the pinion separates from the spline.

11. The work processing apparatus according to claim 9, wherein
the input shaft is supported in a horizontal orientation facing a front opening of the input tube,
the table displacement mechanism drive apparatus horizontally moves the input shaft in an axis direction of the input shaft toward the opening of the input tube until the pinion fits the spline or moves the input shaft back from the input tube until the pinion separates from the spline.

12. The work processing apparatus according to claim 6, wherein
the table displacement mechanism drive apparatus is configured to provide a first power source to the table displacement mechanism when the table displacement mechanism drive apparatus is connected to the table displacement mechanism, and
the body-side inputter/outputter is configured to provide a second power source comprising the at least one of the hydraulic pressure, the pneumatic pressure, the power, or the electrical signal to the table rotary drive apparatus through the table-side inputter/outputter.

13. The work processing apparatus according to claim 1, wherein
the table displacement mechanism drive apparatus is connected to the table displacement mechanism during the time when the table displacement mechanism determines a position of the work piece, and
the table displacement mechanism drive apparatus is not connected to the table displacement mechanism during the time when the work piece is processed by the processing head.

14. The work processing apparatus according to claim 1, further comprising a head support mechanism, wherein
the processing head comprises a thermal spray nozzle configured to perform thermal spray processing for the work piece held on the work table, and
the processing head is supported above the work table by the head support mechanism.

* * * * *